April 14, 1959

H. HERMANNY 2,882,386

TWEEZER-TYPE WELDING APPARATUS

Filed Nov. 25, 1957

INVENTOR.
HEINRICH HERMANNY
BY
William A. Zaleak
ATTORNEY

# United States Patent Office 2,882,386
Patented Apr. 14, 1959

2,882,386

TWEEZER-TYPE WELDING APPARATUS

Heinrich Hermanny, Westfield, N.J., assignor to Radio Corporation of America, a corporation of Delaware Application November 25, 1957, Serial No. 698,623

9 Claims. (Cl. 219—90)

This invention relates to tweezer-type apparatus and particularly to a form of tweezer-type apparatus useful in electrically welding small parts in the mechanized fabrication of electron tube mounts.

In the mechanized fabrication of electron tube mounts, particularly for miniature receiving tubes, it is necessary to weld together extremely small and fragile parts. These parts are often inaccessibly situated within a rather congested array of tube parts and lead-ins. Because of the inaccessibility, the small size, and the fragility of the parts, it is desirable that any welding apparatus used be physically yieldable so as not to apply excessive force on the mount parts should they come in accidental contact. Yet, the welding apparatus should be of sufficient rigidity that it can be accurately manipulated in the performance of a welding operation.

Another desirable feature for such apparatus is that it be easily, yet accurately, adjustable as to contact pressure of the electrode tips. This feature becomes of great importance when the apparatus is used with automatic machinery where it may be applied to one job for a short time and then switched for use on another job involving different parts which require different welding electrode pressures.

Another essential feature is that the electrodes possess floating action as to closing contact of the tips thereof. Such a feature may be described as follows. In closing the pair of electrodes upon the work, if one tip makes contact therewith before the other, the one ceases further closing movement and the other continues to advance into contact with the work. By such a floating closing action, any work positioned off center is not moved by the closing electrodes. Thus, possible distortion due to a forced movement of the work is avoided.

It is therefore an object of my invention to provide improved tweezer-type apparatus for electrically welding small and fragile parts.

Another object of my invention is the provision of improved electric welding apparatus suitable for incorporation in automatic machinery for fabricating electron tube mounts.

Briefly, in one embodiment according to my invention, a pair of flexible straps are mounted on a common support and extend therefrom parallel to each other. Each flexible strap has an electrode holder and a bellows support arm mounted on its free end such that the electrode holder forms an extension of the strap, and the bellows support arm extends in an opposite direction back over the strap. Expansible means, such as an air bellows, operably mounted between the ends of the bellows support arms serve to close a pair of electrodes attached to the ends of the electrode holders.

Figure 1:
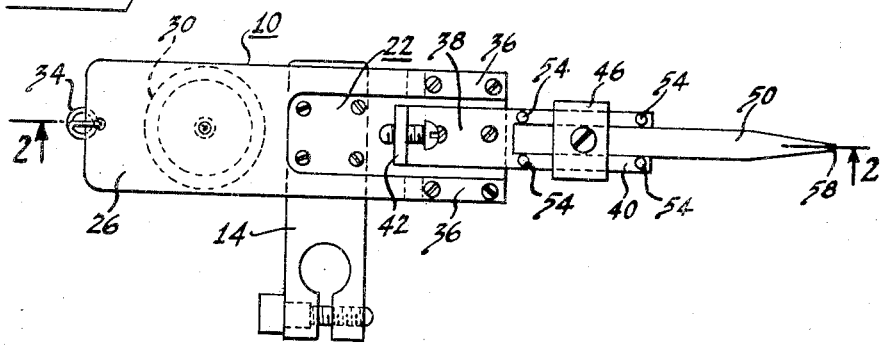
Fig. 1 is a plan view of a preferred embodiment of welding apparatus according to my invention.
Figure 2:
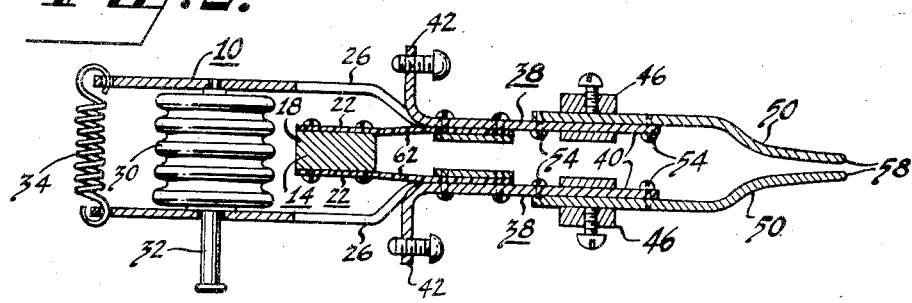
Fig. 2 is an elevational view in partial section of the apparatus of Fig. 1.

Referring to Figs. 1 and 2, a preferred embodiment of electric welding apparatus 10 according to my invention is shown to comprise a support member 14 which terminates in a portion 18 having a rectangular cross section. A pair of flexible insulative straps 22 are mounted on two opposite sides of the rectangular cross section portion 18 of the support member and extend in the same direction parallel to each other transversely of the support member 14. The flexible insulative straps 22 may, for example, be made of hard, Bakelite linen or other similar material. One of a pair of flat U-shaped bellows support arms 26 is attached to each of the flexible insulative straps 22 at their ends remote from the support member 14 and extend back along the straps 22 and over the support member 14. The extending ends of the U-shaped arms are off-set away from each other so as to clear the support member 14.

Expansible means comprising an air bellows 30 having an air inlet pipe 32 is disposed between the extending ends of the U-shaped arms 26 and is adapted to spread the U-shaped arms 26 apart in response to application of air pressure thereto. A coil spring 34 is connected between the extending ends of the U-shaped arms 26 and tends to urge the arms 26 together against the spreading action of the air bellows 30.

A pair of work members comprising L-shaped electrode holders 38 are connected to the free ends of the flexible insulator straps 22 between and out of contact with the extending members 36 of the U-shaped arms 26. One arm 40 of each of the L-shaped electrode holders 38 extends outward from the flexible insulative straps 22 in the same direction which the straps 22 themselves extend from the support member 14. The other arm 42 of each of the L-shaped electrode holders 38 extends perpendicularly away from the insulator straps 22 and serves as a terminal for connection to a weld control unit (not shown). A pair of clamps 46 are carried on the extending ends 40 to the electrode holders 38 and serve to fasten a pair of electrodes 50, one to each of the electrode holders 38. A series of four pins 54 in rectilinear array extend through the arm 40 of each of the electrode holders 38 and serve as guides for the electrodes 50 inserted in the clamps 46. The electrodes 50 may be bent so as to provide a pair of adjacent electrode tips 58 for co-operating contact with each other.

In operation of the electric welding apparatus 10, a controlled source of air pressure (not shown) is connected to the air inlet pipe 32, and the output power leads of an electrical weld control unit (not shown) are connected to the terminal arms 42 of the electrode holders 38. To close the tips 58 of the electrodes 50 upon two parts which are to be welded together, air pressure is applied to the bellows. In response to such an application the bellows 30 are expanded against the force of the spring 34 and spread the extending ends of the U-shaped arms apart. As a result, the flexible insulative straps 22 are caused to flex at points 62 allowing the electrode tips 58 to be brought together. Thus, the electric welding apparatus 10 acts somewhat in the nature of a pair of tweezers.

Inasmuch as the U-shaped arms 26, the electrode holders 38, and the electrodes 50 are relatively rigid and are rigidly fixed to the end of the flexible insulative straps 22, an overall rigidity obtains which permits accurate and precise manipulation of the tips 58. Yet, because of the flexibility of the straps 22, the entire composite arms 26—38—50 of the apparatus 10 possess an overall flexibility relative to their common support which prevents damage to a work piece should that work piece be accidentally contacted by the electrodes 50.

Figure 3:
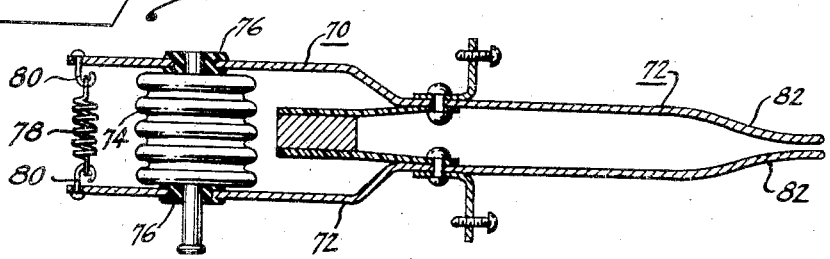
Figure 3 is an elevational view in partial section of a modification.

Referring to Fig. 3, a modification of my invention comprises electric welding apparatus 70 in which an integral arm 72 functions in the same manner as does the composite arm 26—38—50 of Figs. 1 and 2. In some respects this integrality results in a preferred structure since mounting of parts on the flexible straps 22 is simplified. Since the two integral arms 72 of Fig. 3 must be electrically insulated from each other, the bellows 74 is mounted between a pair of insulator blocks 76 which are in turn mounted on the integral arms 72, and the coil spring 78 is attached to the integral arms 72 by a pair of hooks 80 made of insulating material. It will be appreciated that means other than the insulator blocks 76 and the insulator hook 80 can be used to electrically isolate the two integral arms 72 from each other. Likewise, it should be appreciated that the electrode portion 82 of the integral arms 72 may be provided as separate members attached to the arms 72 similar to the manner in which the electrodes 50 are attached to the electrode holders 38 in the embodiment of Figs. 1 and 2.

According to my invention, the tips 58 (Figs. 1 and 2) function co-operatively in closing upon a pair of work pieces such that if the work pieces are inserted off center between the two tips, they will not be distortedly moved by the tips during closing. Rather, the first tip to contact the work will cease movement upon contact and the other tip will continue to advance into closing contact. Such a floating action, the merit of which has been previously described, obtains from the fact that the power means closing the electrodes acts on each electrode relative to the other, rather than independently on each one relative to some fixed member.

The use of air bellows as the expansible means in apparatus such as hereinbefore described permits very accurate yet adjustable control of the contact force by the tips. This is true since a source of air presure can be much more easily adjusted than can any mechanical force means such as a spring. Thus, the characteristic of versatility in application to automation is achieved.

In the foregoing description of a preferred embodiment of my invention, the flexible straps 22 have been described as insulative. Suitable materials having the desired flexibility, resiliency, and insulativeness make this an entirely satisfactory method of flexibly mounting the two electrode holders 38 out of electrical contact with each other. However, it will be appreciated that the flexible straps 22 need not be made of insulative material so long as other means is provided to electrically insulate the two electrode holders 38 from each other. In fact, in heavy duty apparatus, according to my invention, the flexible straps are preferably either Bakelite linen backed up with metal leaf springs or just the metal leaf springs alone. In either case, means are provided to insulatively mount the electrode holders on the flexible straps. Such can be done by any conventional expedient known to the art. For example, the flexible straps can be backed up with insulative washers, and then the electrode holders bolted or riveted thereto with the rivets passing through enlarged apertures in, but out of contact with, the straps.

Other modifications without departing from the spirit of my invention will be readily suggested to those skilled in the art. Where versatility of application or accurate control of electrode tip contact pressure is not of great importance, other expansible means for activating the tweezer movement of the apparatus may be substituted for the air bellows 30. For example, a piston-cylinder mechanism, a flexible diaphragm mechanism, or some purely mechanical mechanism can be used. Then too, the means for attaching the electrodes 50 to the electrode holders 38 is not critical and need not take the form of the clamp and guide pin arrangement shown.

What is claimed is:

1. A tweezer-type device comprising a support member, a pair of flexible straps mounted on and extending from said support member, a pair of support arms mounted on and extending from the extending ends of said straps, a pair of elongated work members mounted on and extending from the extending ends of said straps, and expansible means mounted on and between the extending ends of said arms and adapted to spread said arms apart.

2. A tweezer-type device comprising a support member, a pair of flexible straps mounted on and extending from said support member, one of a pair of support arms mounted on the extending end of each of said straps and extending in a given direction substantially back over said strap, one of a pair of elongated work members mounted on the extending end of each of said straps and extending in a direction substantially opposite to said given direction, and expansible means mounted to and between the extending ends of said arms adapted to spread said arms apart.

3. Tweezer-type apparatus comprising a pair of flexible straps mounted at their one ends parallel to each other on a common support member, a pair of arms mounted intermediate their ends on the extending ends of said straps and substantially parallel to said straps, and expansible means operably mounted between adjacent ends of said arms.

4. Welding apparatus comprising a support member, a pair of flexible straps mounted at their one ends on said support member and extending parallel to each other, an electrode member mounted on the free end of each of said straps and forming an extension of said straps, a support arm mounted on the free end of each of said straps and extending back over said straps, and expansible means disposed between the free ends of said support members and adapted to spread said free ends apart.

5. Electric welding apparatus comprising a support member having opposed tweezer-like members mounted thereon, each of said tweezer-like members comprising a flexible strap mounted at one end thereof on said support member and having at the other end thereof a substantially rigid electrically conductive extension thereof and a substantially rigid arm extending back over said strap and said support member, and expansible means mounted between said arms for spreading said arms apart.

6. Electric welding apparatus comprising a support member and a pair of tweezer-like members having opposed corresponding parts, each of said tweezer-like members comprising an elongated flexible strap mounted at its one end to said support member and having oppositely extending arms attached thereto at its other end, one of said arms extending back over said strap, and expansible means mounted between the backwardly extending arms of said pair of tweezer-like members and adapted to spread said arms apart.

7. Electric welding aparatus comprising a support member; a pair of flexible insulative straps mounted parallel to each other on said support member and extending therefrom in a given direction; a pair of electrode supports, one mounted on the extending end of each of said straps and extending therefrom in said given direction; a pair of electrode tips, one mounted on each of the extending ends of said electrode holders and extending therefrom in opposed co-operative relation with the other; a pair of elongated arms, one mounted on the extending end of each of said straps and extending therefrom in a direction substantially opposite to said given direction, said arms being off-set so as to extend back over and out of contact with said support member; and an air bellows unit operably mounted on and between the extending ends of said arms.

8. Apparatus of the type described comprising a pair of elongated coextensive rigid tweezer arms, means supporting said arms for angular movements with respect to each other, said means comprising a support assembly disposed between said arms, said support assembly including a rigid member having opposite sides, and two flexible parallel and coextensive straps, one group of adjacent end portions of said straps being fixed to said arms, the other group of adjacent end portions of said straps being fixed to said opposite sides, said straps extending in parallel relation to said arms, and means between and attached to one group of adjacent end portions of said arms for varying the spacing therebetween, whereby said arms rotate about a fulcrum comprising a portion of said flexible straps, and the other group of adjacent end portions of said arms are adapted to process a workpiece.

9. Apparatus of the type described comprising a rigid support member having spaced parallel sides, a pair of elongated straps having end portions fixed to said sides to dispose said straps in coextensive parallel relation with other end portions of said straps spaced from said support, two elongated and relatively rigid arms fixed intermediate their lengths to said other end portions and disposed in parallel relation to said straps, one group of adjacent ends of said arms extending beyond said other end portions of said straps, the other group of adjacent ends of said arms extending beyond said rigid support in a direction opposite to said other end portions, and means between and engaging said arms adjacent to said other group of adjacent ends thereof for controllably varying the distance between said last-named ends, whereby the spacing between the other adjacent ends of said arms is varied for processing a workpiece therebetween.

References Cited in the file of this patent

UNITED STATES PATENTS

| | | |
|---|---|---|
| 2,371,664 | Workman | Mar. 20, 1945 |
| 2,454,338 | Pityo et al. | Mar. 23, 1948 |